U S009672086B2

(12) United States Patent
Barajas (10) Patent No.: US 9,672,086 B2
(45) Date of Patent: *Jun. 6, 2017

(54) SYSTEM, METHOD, AND COMPUTER PROGRAM PRODUCT FOR PHYSICAL DRIVE FAILURE IDENTIFICATION, PREVENTION, AND MINIMIZATION OF FIRMWARE REVISIONS

(71) Applicant: International Business Machines Corporation, Armonk, NY (US)

(72) Inventor: Felipe A. Barajas, Tempe, AZ (US)

(73) Assignee: International Business Machines Corporation, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/267,440

(22) Filed: May 1, 2014

(65) Prior Publication Data

US 2014/0245072 A1 Aug. 28, 2014

Related U.S. Application Data

(63) Continuation of application No. 13/112,922, filed on May 20, 2011, now Pat. No. 8,751,858.

(51) Int. Cl.
*G06F 11/00* (2006.01)
*G06F 11/07* (2006.01)

(52) U.S. Cl.
CPC ........ *G06F 11/0727* (2013.01); *G06F 11/008* (2013.01)

(58) Field of Classification Search
CPC .................................................. G06F 11/0727

USPC ................................ 714/6.1, 6.2, 6.32, 6.33
See application file for complete search history.

(56) References Cited

U.S. PATENT DOCUMENTS

| 5,422,890 | A | 6/1995 | Klingsporn et al. |
|---|---|---|---|
| 5,943,670 | A | 8/1999 | Prager |
| 7,136,768 | B1 | 11/2006 | Shah et al. |
| 7,155,634 | B1 | 12/2006 | Le Graverand et al. |
| 7,451,355 | B1 | 11/2008 | Coatney et al. |
| 7,580,956 | B1 | 8/2009 | Xin et al. |
| 7,650,531 | B2 | 1/2010 | Yeung et al. |
| 7,701,700 | B2 | 4/2010 | Hall et al. |
| 7,743,284 | B1 | 6/2010 | Taylor et al. |
| 8,035,409 | B2 | 10/2011 | Deutsch et al. |
| 8,352,790 | B2 | 1/2013 | Nakagawa et al. |
| 8,751,858 | B2 * | 6/2014 | Barajas ................. G06F 11/008 714/6.1 |
| 2005/0149570 | A1 | 7/2005 | Sasaki et al. |
| 2006/0123189 | A1 | 6/2006 | Bitner et al. |
| 2008/0294651 | A1 | 11/2008 | Masuyama et al. |
| 2009/0049396 | A1 | 2/2009 | Fisher et al. |

(Continued)

OTHER PUBLICATIONS

Shah et al., "Reliability Analysis of Disk Drive Failure Mechanisms," 2005 IEEE, RAMS 2005, pp. 226-231.

(Continued)

*Primary Examiner* — Dieu-Minh Le
(74) *Attorney, Agent, or Firm* — Zilka-Kotab, PC (57) ABSTRACT

In one embodiment, a method for managing DDM failures includes analyzing, using a hardware processor, information stored in a data repository and relating to DDM failures to identify problems in an installed base of DDM, the analysis comprising analyzing comparative DDM failure data.

16 Claims, 7 Drawing Sheets

(56) References Cited

U.S. PATENT DOCUMENTS

2012/0297253 A1  11/2012  Barajas
2016/0154688 A1   6/2016  Barajas

OTHER PUBLICATIONS

Shah et al., "Disk Drive Vintage and Its Effect on Reliability," 2004 IEEE, RAMS 2004, pp. 163-167.
Non-Final Office Action from U.S. Appl. No. 13/112,922 dated May 23, 2013.
Final Office Action from U.S. Appl. No. 13/112,922 dated Sep. 30, 2013.
Notice of Allowance and Fee(s) Due from U.S. Appl. No. 13/112,922 dated Jan. 24, 2014.
Barajas, F., U.S. Appl. No. 14/558,581, filed Dec. 2, 2014.
Tal et al., "New Method and Apparatus for Device Failure Risk Assessment," IP.Com, Motorola Inc., Oct. 31, 2007, pp. 1-5.
Barajas, U.S. Appl. No. 13/112,922, filed May 20, 2011.

* cited by examiner

SYSTEM, METHOD, AND COMPUTER PROGRAM PRODUCT FOR PHYSICAL DRIVE FAILURE IDENTIFICATION, PREVENTION, AND MINIMIZATION OF FIRMWARE REVISIONS

RELATED APPLICATIONS

This application is a continuation of U.S. patent application Ser. No. 13/112,922, filed May 20, 2011, which is herein incorporated by reference.

BACKGROUND

The present invention relates to data storage, and more particularly, this invention relates to minimizing firmware revisions for physical data storage devices in a data storage system.

Currently, virtual tape servers, such as the IBM TS7700, include a disk cache subsystem which gets installed with a gamut of different physical disk drive media (DDM). This encompasses different physical drive types, capacities, manufacturers, rotational speeds, etc.

Due to the nature of virtual tape servers, if any number of DDMs are defective (e.g., suffering from faulty microcode, manufacturing problems, mechanical breakdown, etc.), the problem is not easily identifiable and/or avoidable once the DDM is installed in virtual tape system in the field.

All DDM firmware changes/updates are automatically installed during activation of the microcode used to communicate with each DDM. If a given DDM needs to be upgraded, the virtual tape server activation time window is greatly increased as opposed to an activation time window for a DDM which does not need microcode changes/updates. In order to conserve time and save money, all DDM firmware changes/updates should be kept at a minimum. Currently there is no solution yet implemented to identify problems before a user of the virtual tape server is impacted and new DDM firmware is absolutely required.

BRIEF SUMMARY

According to one embodiment, a computer program product for managing disk drive media (DDM) failures includes a computer readable storage medium having program instructions embodied therewith, the program instructions being executable by a processor to cause the processor to analyze, by the processor, information relating to DDM failures and stored in the data repository to identify problems in an installed base of DDM, the analysis comprising analyzing comparative DDM failure data.

In another embodiment, a system a processor and logic integrated with and/or executable by the processor, the logic being configured to: analyze information relating to DDM failures and stored in the data repository to identify problems in an installed base of DDM, the analysis comprising analyzing comparative DDM failure data.

In yet another embodiment, a method for managing DDM failures includes analyzing, using a hardware processor, information relating to DDM failures to identify problems in an installed base of DDM, the analysis comprising analyzing comparative DDM failure data.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to several embodiments, problems that are encountered in conventional virtual tape servers (VTSs) may be avoided. In one embodiment, physical disk drive media (DDM) failures may be identified without user input. For example, when a DDM fails, a background monitoring tool may automatically detect the failure, may call a technician for repair, and/or may log the failure in an index for tracking purposes. A DDM, for the purposes of the descriptions herein, may be any disk drive and associated disk drive medium, such as a hard disk drive (HDD), optical disk drive, etc.

In another embodiment, when a failure is identified, such as through the techniques described above, the index may be sent to a central repository, that may be managed by an entity which installed/maintains the virtual tape server. This repository may then include drive samples from across a wide installed base in the field.

In another embodiment, the data collected in the repository may be analyzed, such as through an autonomous script with a goal of identifying problems affecting the installed base in the field. This script may employ statistical-based heuristics on the data collected to minimize drive firmware turnaround, among other issues. Any problems identified may be flagged and/or reported to an entity that maintains the installed base.

When a problem is flagged, the entity which installed/maintains the virtual tape server may be engaged to understand the root cause of the problem. For example, if the script suggests that a quality control issue exists for a DDM from a certain vendor, the entity which installed/maintains the virtual tape server may further investigate actions to be taken. According to various embodiments, actions may include seeking help from vendor and/or obtaining a firmware fix for the DDM, blocking that specific DDM from being installed in more virtual tape servers in the future, and/or removing that specific DDM from the installed base. The entity which installed/maintains the virtual tape server has the option of feeding back the results of the root cause analysis back into the field, possibly using the same repository. This is helpful to block any other affected DDMs from being installed in a given system.

According to another embodiment, DDM microcode may be embedded in the virtual tape server microcode, and thus the analysis results available after analysis performed as described above may help to minimize microcode turnaround times, an advantage over currently used practices.

According to one general embodiment, a computer program product for managing DDM failures includes a computer readable storage medium having computer readable program code embodied therewith. The computer readable program code includes computer readable program code configured to: receive information relating to DDM failures in virtual tape servers; store the information relating to the DDM failures in a data repository; and analyze the information stored in the data repository to identify problems in an installed base of DDM, the analysis including analyzing comparative DDM failure data.

In another general embodiment, a system includes logic adapted for receiving information relating to DDM failures in an installed base of DDM across multiple VTSs, a storage device adapted for storing the information relating to the DDM failures in a data repository, and a processor adapted for analyzing the information stored in the data repository to identify problems in the installed base of DDM, the analysis including analyzing comparative DDM failure data comprising vectors.

In yet another general embodiment, a method for managing DDM failures includes receiving information relating to DDM failures in virtual tape servers; storing the information relating to the DDM failures in a data repository; and analyzing the information stored in the data repository to identify problems in an installed base of DDM, the analysis including analyzing comparative DDM failure data from multiple virtual tape servers for determining whether to perform a firmware and/or hardware update on at least one of the virtual tape servers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the tape management system is referred to herein as a Virtual Tape System (VTS) or Virtual Tape Server (VTS), a VTS is only one example of a tape management system. As would be understood by one of ordinary skill in the art, the present disclosure applies to any tape management system, such as a tape library and virtual tape software, etc.

Figure 1:
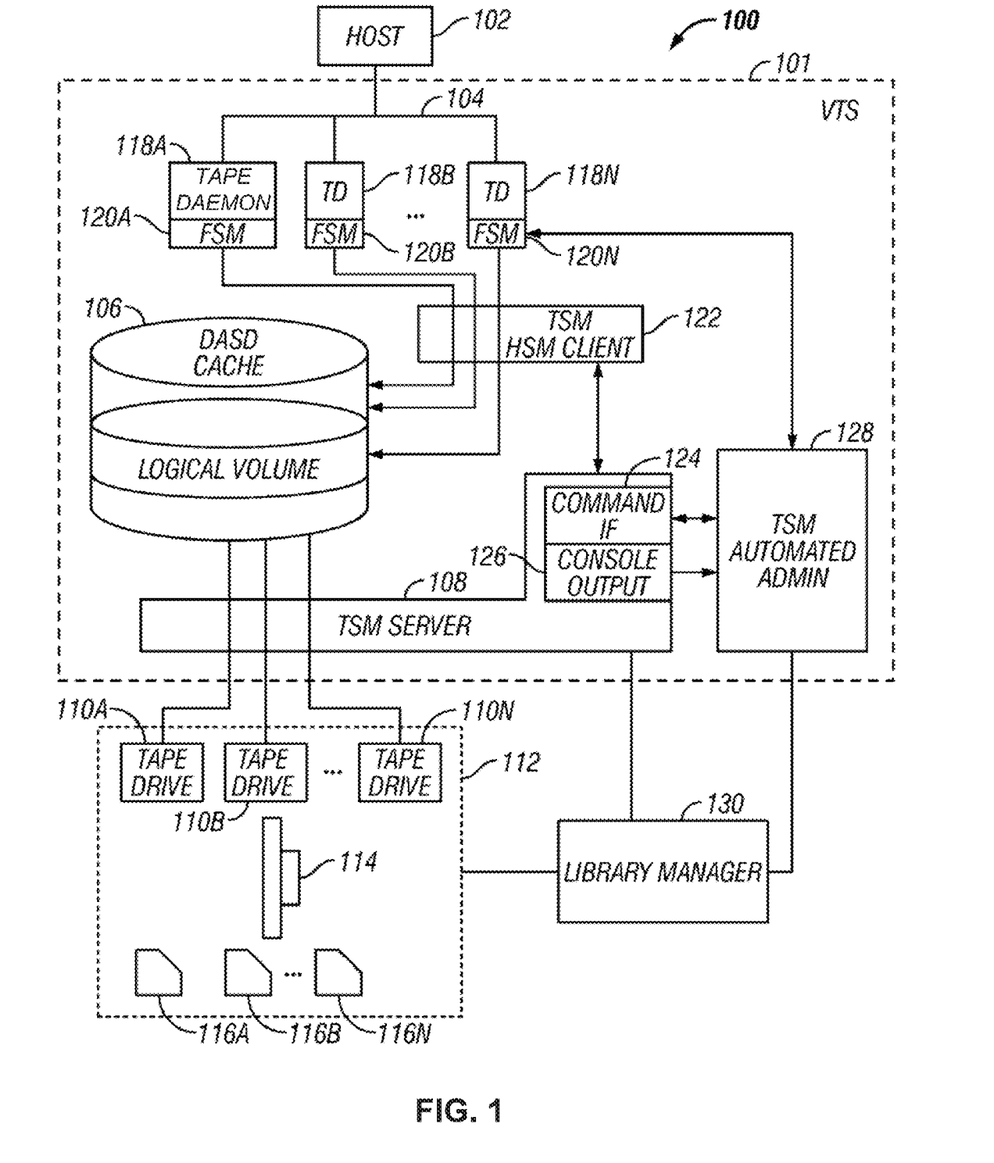
FIG. 1 illustrates a detailed block diagram of a data storage network including a data storage subsystem, according to one embodiment.

With reference now to FIG. 1, there is depicted a block diagram of an exemplary virtual storage system 100 that provides a suitable environment for the practice of the present disclosure. Virtual storage system 100 includes a virtual tape server 101, a tape library 112, and a library manager 130. A host system 102 is linked to the virtual tape server 101 via a network connection, e.g. TCP/IP, LAN, Ethernet, and the IBM Enterprise System Connection (ESCON) (not shown). In one embodiment, host system 102 is a computer, such as a personal computer, workstation or mainframe that is linked to the virtual tape server 101 via an ESCON channel. Virtual tape server 101, in one embodiment, is a computer including a processor, such as a personal computer, workstation or mainframe and is associated with a Direct Access Storage Device (DASD) cache 106. The DASD cache 106 preferably includes one or more logical volumes. In one embodiment, DASD cache 106 includes a plurality of hard disks that are spaced into redundant array of inexpensive disk (RAID) arrays.

Tape library 112 includes a plurality of tape drives 110, generally designated tape drives 110A, 110B . . . 110N, such as International Business Machine (IBM), TS1100 or Jaguar 3592 tape drives or any other tape drive known in the art. Generally, a removable storage volume, e.g., a tape cartridge 116A, 116B, . . . 116N, is loaded into each of the tape drives. Tape storage drives 110 are serviced by an accessor (e.g., a robot) 114 which transfers selected tape cartridges 16A, 16B, . . . 116N between tape storage drives 110 and their corresponding positions within a tape cartridge repository.

It will be noted that the variable identifier "N" is used in several instances in FIG. 1 to more simply designate the final element (e.g., tape drives, 110A, 110B . . . 110N, and tape cartridges, 116A, 116B, . . . 116N) of a series of related or similar elements (e.g., tape drives and tape cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Tape library 112 typically includes storage management software utilized to monitor the active space on the tape cartridges and schedule reclamations of tape cartridges when the system is less active. In one embodiment, tape library 112 is a tape library system such as the IBM Virtualization Engine TS 7740 and IBM Magstar 3494 Tape Library. Library manager 130 is utilized in virtual storage system 100 to install, maintain, configure, and operate tape library 112. Within automated library 112, accessor 114 may be controlled utilizing a library manager 130 based upon inputs received from storage management server 108 and/or an automated storage management administrator 128.

DASD cache 106 that includes, in one embodiment, a tape volume cache, provides a cache for data stored in tape library 112. DASD cache 106 maintains logical volumes as logical volume files that are concatenated into physical volume files in the tape cartridges loaded in the tape drives located within tape library 112. When a logical volume file in DASD cache 106 moves to a tape drive in a tape library 112, the logical volume file is written to a physical volume file on a tape cartridge in the actual tape drive. When a physical volume file is recalled for a tape drive and moved to DASD cache 106, the physical volume file then becomes a logical volume file in the DASD cache 106. In this way, DASD cache 106 provides a window to host system 102 of all the physical volume files in tape library 112.

Virtual tape data storage system includes a plurality of virtual tape daemons, generally designated as tape daemons 118A, 118B, . . . 18N, that represent and emulate virtual tape devices to host system 102. Host system's 102 operating system, in turn, manages the presentation of the virtual tape devices to the systems users (not shown). Host system 102 views the virtual tape devices as actual drives and when host system 102 attempts to access a logical volume in a selected virtual tape device, the respective virtual tape daemon associated with the virtual tape device requested by the host system 102 will handle the host access request.

Host-to-DASD cache data transfer in the illustrated virtual tape data storage subsystem may be controlled by VTS code via a process such as a hierarchical storage manager (HSM) client 122. For example, a HSM client 122 within virtual storage system 100 intercepts and processes the access request from the virtual tape daemons 118A, 118B, . . . 118N. HSM client 122 then carries out host system 102 request to access the logical volume file on DASD cache 106. In one embodiment, host-to-DASD cache data transfer is directly controlled by a file system manager (FSM) 120A, 120B, . . . 120N which handles DASD read and write commands.

Similarly, an interface between the DASD cache 106 and the tape storage drive 110 may be controlled by storage management server 108. For example, if HSM client 122 attempts to mount a logical volume file that is not located in DASD cache 106, HSM client 122 will communicate the access request to the storage manager server 108. If the tape in the access request is already mounted in a tape drive in tape library 112, storage manager server 108 will access the physical volume for the requested logical volume file from the mounted tape. However, if the requested file on a tape is not presently mounted in a tape drive, the storage manage server 108 will initiate a request to library manger 130 to mount the tape containing the physical volume corresponding to the requested logical volume file.

Examples of a storage management processing module which could be used as storage management server 108 and HSM client 122 are the Tivoli Storage Manager (TSM) application and IBM ADSTAR Distributed Storage Manager (ASDM) product, both of which are provided by International Business Machines Corporation of Armonk, N.Y. In data storage network 100, storage management server 108 includes a command interface 124 and a console output 126.

In a one embodiment, storage manager server 108 migrates entire logical volume files from DASD cache 106 to tape library 112. When the available space in DASD cache 106 reaches a predetermined level or after a predetermined time period, and automated storage management administrator 128 will direct storage manager server 108 to migrate logical volume files from DASD cache 106 to tape library 112 for archival therein. Typically, automated storage management administrator 128 stores information associated with the physical volumes in an associated volume status table (not shown). According to one embodiment, automated storage management administrator 128 provides functionality needed to achieve the secure data erase process of the present disclosure, and additionally performs many VTS specific administrative functions utilizing storage management server 108. For example, automated storage management administrator 128 may include a secure data erase processing module.

The requirement that the old version(s) of the VTS volume must be handled to guarantee that they cannot be recovered is met by overwriting a physical volume that contains invalidated virtual volume data within a certain time interval (i.e. grace period) specified by the customer. Thus, there is introduced a function, implemented by the VTS, and particularly, the automated storage management administrator 128 component of the VTS, for enabling data associated with a virtual or logical volume to be invalidated. A physical volume and its associated data may be secure data erased (i.e., rendered permanently unreadable by any reasonable means) by overwriting all data of the physical volume one or more times utilizing a predetermined file or data pattern (e.g., logical ones, zeroes, some combination thereof). Techniques for the secure data erase process may be user or host-selectable (e.g., based upon a desired level of security) or automatically determined. The overwriting may be performed by one of the tape drives 110A, 110B . . . 110N.

Figure 2A:
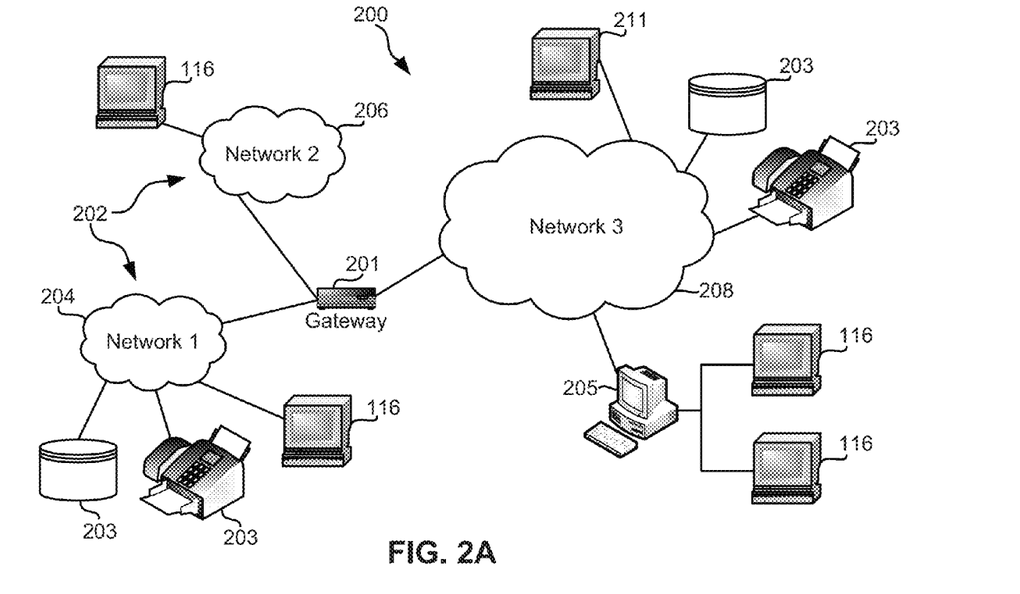
FIG. 2A illustrates a network architecture, in accordance with one embodiment.

FIG. 2A illustrates a network architecture 200, in accordance with one embodiment. As shown in FIG. 2A, a plurality of remote networks 202 are provided including a first remote network 204 and a second remote network 206. A gateway 201 may be coupled between the remote networks 202 and a proximate network 208. In the context of the present network architecture 200, the networks 204, 206 may each take any form including, but not limited to a LAN, a WAN such as the Internet, PSTN, internal telephone network, etc.

In use, the gateway 201 serves as an entrance point from the remote networks 202 to the proximate network 208. As such, the gateway 201 may function as a router, which is capable of directing a given packet of data that arrives at the gateway 201, and a switch, which furnishes the actual path in and out of the gateway 201 for a given packet.

Further included is at least one data server 205 coupled to the proximate network 208, and which is accessible from the remote networks 202 via the gateway 201. It should be noted that the data server(s) 205 may include any type of computing device/groupware. Coupled to each data server 205 is a plurality of user devices 207. Such user devices 207 may include a desktop computer, lap-top computer, hand-held computer, printer or any other type of logic. It should be noted that a user device 211 may also be directly coupled to any of the networks, in one embodiment.

A peripheral 203 or series of peripherals 203, e.g., facsimile machines, printers, networked and/or local storage units or systems, etc., may be coupled to one or more of the networks 204, 206, 208. It should be noted that databases and/or additional components may be utilized with, or integrated into, any type of network element coupled to the networks 204, 206, 208. In the context of the present description, a network element may refer to any component of a network.

Figure 2B:
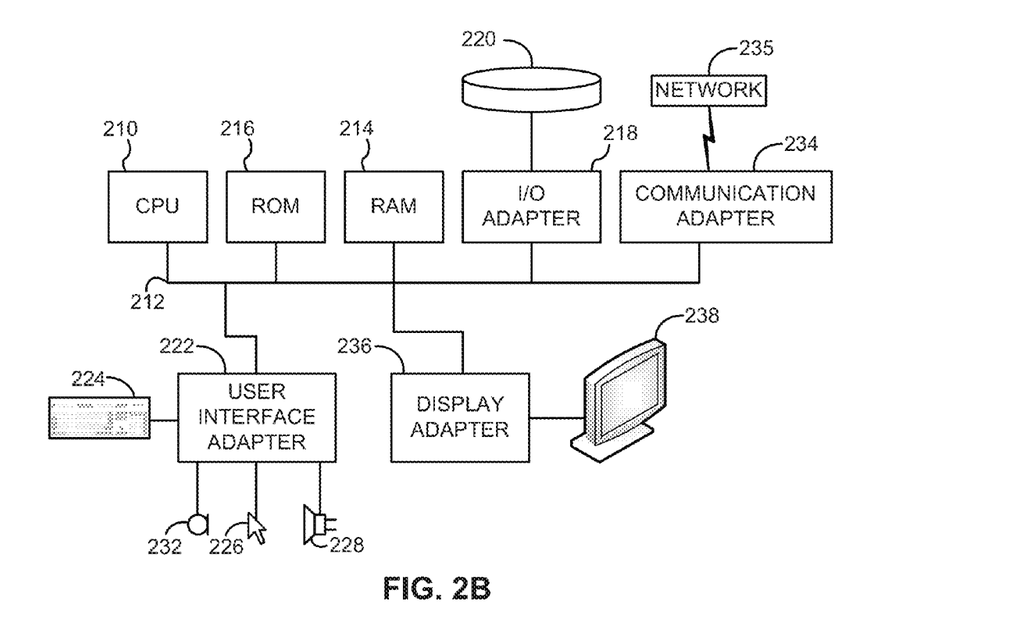
FIG. 2B shows a representative hardware environment that may be associated with the servers and/or clients of FIG. 2A, in accordance with one embodiment.

FIG. 2B shows a representative hardware environment associated with a user device 207 and/or server 205 of FIG. 2A, in accordance with one embodiment. Such figure illustrates a typical hardware configuration of a workstation having a central processing unit 210, such as a microprocessor, and a number of other units interconnected via a system bus 212.

The workstation shown in FIG. 2B includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
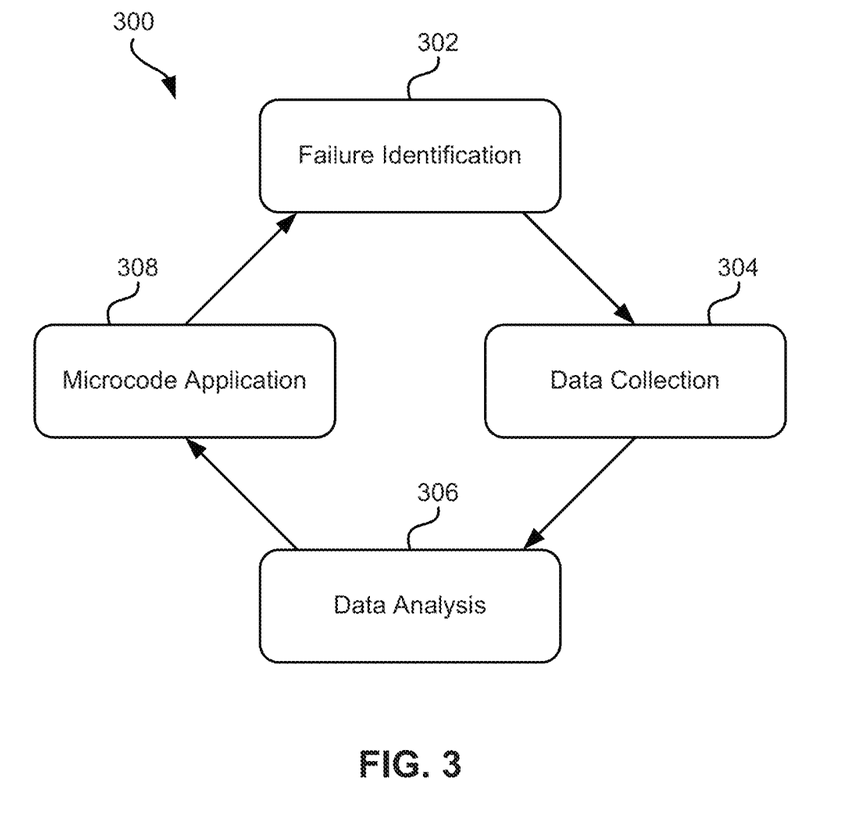
FIG. 3 shows a simplified block diagram of components of a system, according to one embodiment.

As shown in FIG. 3, according to some approaches, four tasks may be performed in conjunction or separately using components of a system 300: identifying failures 302, collecting data 304, analyzing data 306, and applying new microcode 308. The interaction between the major components is shown in FIG. 3 according to one embodiment, and a more detailed view is shown in FIG. 4, according to another embodiment.

Figure 4:
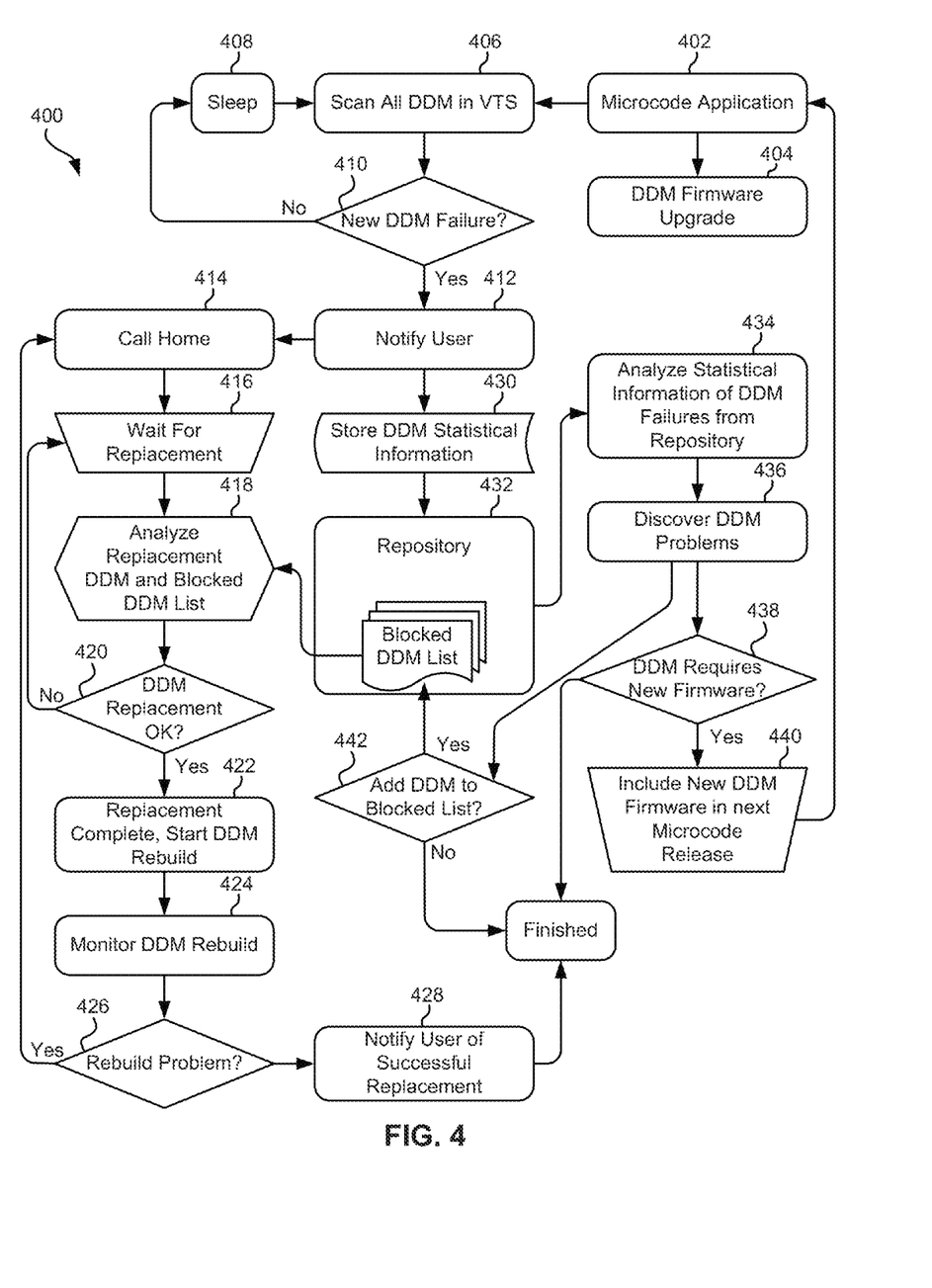
FIG. 4 shows a flowchart of a method, according to one embodiment.

With reference to FIG. 4, according to one embodiment, a method 400 for DDM failure identification and analysis is shown. The method 400 may be carried out in any desired environment. As shown, when microcode is applied 402 to a plurality of DDMs in a VTS (which may include a firmware upgrade 404 for selected DDMs), all DDMs may be scanned 406 to determine is any problems are occurring. If a new DDM failure is reported 410, then a user may be notified 412. If not, the method 400 may sleep 408 until a failure is reported.

The DDM statistical information, including information relating to the DDM failure, may be stored 430 in the data repository 432. Also, a call home 414 may be placed to inform an entity that maintains the VTS that a DDM failure has occurred. Since a new DDM will have to replace the failed DDM, this new DDM must be waited for 416. During this time, analysis may be performed on a replacement DDM taking into account the blocked DDM list 418.

In operation 420, it is determined if the replacement DDM is appropriate, and if not, a new DDM must be waited for at operation 416. If it is acceptable, the failed DDM is replaced and a DDM rebuild is started 422, the DDM rebuild is monitored 424, and if a problem occurs during the rebuild 426, a call home is placed 414 and a new replacement is waited for 416. If the rebuild is successful, the user is notified as such 428.

After DDM statistical information 430 is stored in the repository 432, the information is analyzed, including information relating to DDM failures 434. New DDM problems may be discovered based on the analysis 436, particularly when using a minimization function that is described herein according to various embodiments. If new problems are discovered, it is determined if new DDM firmware is required 438 or will fix the problems. If not, the method 400 is complete: otherwise, new firmware is included in the next microcode release 440 to be applied during microcode application 402. Also, it is determined if the DDM should be added to the blocked DDM list 442, and if so it is added in the data repository 432; otherwise, the method 400 is complete.

One of the goals of the failure identification portion included in microcode of the system is to identify any DDM that fail in the system by periodically scanning all DDM. When a DDM has been identified as having failed, the failure identification portion may automatically log the failure and notify any interested party, such as a user or system administrator, by sending a message to signify conditions between components of the system at the time of the failure. In this way, the system may effectively call for help.

This message may trigger an eventual arrival of a service engineer who will then replace and/or repair the failed DDM(s). One key reason for logging the failure is to store as much information about the failed DDM as possible. For example, some possible information that may be stored includes: the size of the DDM, rotational speed of the DDM, DDM technology type (SATA, Fiber, solid state, etc.), firmware version of the DDM, nature of the failure, etc. According to one embodiment, three types of failures may be considered by the failure identification component of the system: soft, hard, and manual (also referred to as impending). A soft failure is a failure detected by microcode in the system, a hard failure is a failure detected by the DDM itself, and a manual failure is when the DDM is projected to fail in the future and should be proactively replaced.

The collected data is periodically saved up to a server, which acts as a repository for all the failure logs throughout all the DDMs for every individual installation site where DDMs are installed (such as customer sites, user sites, businesses, etc.).

The data collection component in the system consolidates the information collected from all the data logs, such as all data logs from every site, every DDM, every day, or according to any other split. One purpose of the data collection component is to aggregate all the different parameters into one place, according to one embodiment. For example, the data logs may be combined and the different types of failures (hard, soft, and manual) may be sorted according to any further parameters, such as DDM manufacturer, installation date, etc.

The Analysis component scans the data collected in the repository and analyzes the data entries for problems. One of the key aspects of this component is that it may isolate the worst performing DDM(s) in the field. DDM fixes may be optimized by concentrating on the DDM(s) that are causing the most/worst problems. This approach minimizes DDM firmware turn around. The fewer DDMs that need to update/upgrade firmware, the less time is spent on the overall microcode installation. Additionally, by analyzing the data collected for severely defective DDMs, a developer, system administrator, user, etc., will have the option to black-list one or more DDMs from getting installed as a field replaceable unit (FRU) in the system where it failed and/or any other system in the installed base. This prevents a service engineer from attempting to install a DDM that is known to have problems.

This method helps alleviate the need to re-stock FRU inventory and avoid installing DDMs that are known to cause severe problems.

Figure 6:
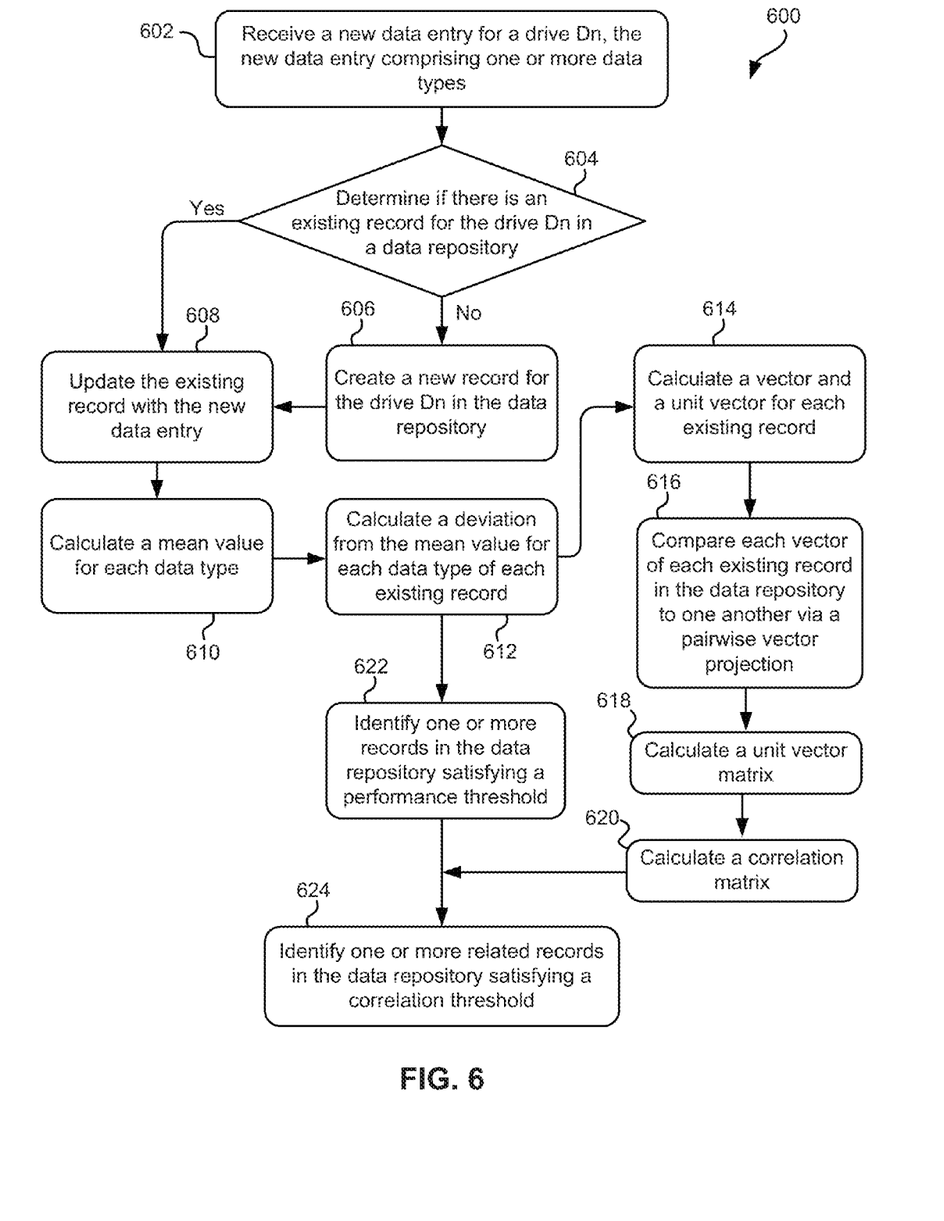
FIG. 6 shows a flowchart of a method, according to one embodiment.

Now referring to FIG. 6, a method 600 for identifying and managing DDM failures in a VTS is shown according to one embodiment. The method 600 may be carried out in any desired environment, such as that shown in FIGS. 1-4, according to various embodiments. The method 600, according to one embodiment, may represent a minimization function used to identify the least number of drives that are causing problems in the field. The method 600 may be summarized as follows: given statistical data about DDM failures 602, store the data 604 in an existing 608 or new record 606, combine the data, and sort the hard, soft, and manual failures by DDM manufacturer. Once this information has been gathered, the analysis includes calculating a mean of each failure type 610 and identifying a deviation from the mean of each DDM manufacturer 612. Also, a vector and a unit vector for each record is created 614, each vector is compared with one another 616, a unit vector matrix is created 618, and a correlation matrix is created 620. Then, the DDM(s) that are causing problems in the field are identified from the correlation of each DDM manufacturer's failure rates 622, 624.

The method 600 may be further explained through an example. Consider the following data about DDM failures in the field as presented in Table 1.

TABLE 1

| Drive | Hard Failures | Soft Failures | Manual Failures | Totals |
|---|---|---|---|---|
| D1 | 450 | 20 | 320 | 790 |
| D2 | 60 | 165 | 310 | 535 |
| D3 | 440 | 320 | 30 | 790 |
| D4 | 52 | 61 | 92 | 205 |
| D5 | 250 | 164 | 161 | 575 |
| D6 | 240 | 240 | 196 | 676 |
| D7 | 300 | 790 | 200 | 790 |
| Mean | 256 | 180 | 187 | 623 |

D1 is DDM manufacturer 1, D2 is DDM manufacturer 2, etc. The total number of failures per manufacturer and the mean of the failures is also included. Next, by considering the totals, it is obvious that the DDM with the least total failures is D4 with 205 failures, and the DDMs with the most total failures are D1, D3 and D7, all with 790 failures. But it may be unknown which one is the worst of these three. For example, at one might initially believe it would be D1 because it has the most hard failures, or D3 because it has the most soft failures, etc. This illustrates that a simple minimum/maximum algorithm is not robust enough to identify DDM problems. To derive a useful statistical measure of DDM failure, each DDM manufacturer may be compared against each other by calculating a correlation against one another. The process begins by subtracting the mean from each of the failures. This identifies the deviation from the mean by each DDM manufacturer type as shown in Table 2.

TABLE 2

| Drive | Hard Failures | Soft Failures | Manual Failures | Totals |
|---|---|---|---|---|
| D1 | 194 | −160 | 133 | 167 |
| D2 | −196 | −15 | 123 | −88 |
| D3 | 184 | 140 | −157 | 167 |
| D4 | −204 | −119 | −95 | −418 |
| D5 | −6 | −16 | −26 | −48 |
| D6 | −16 | 60 | 9 | 53 |
| D7 | 44 | 110 | 13 | 167 |

Figure 5:
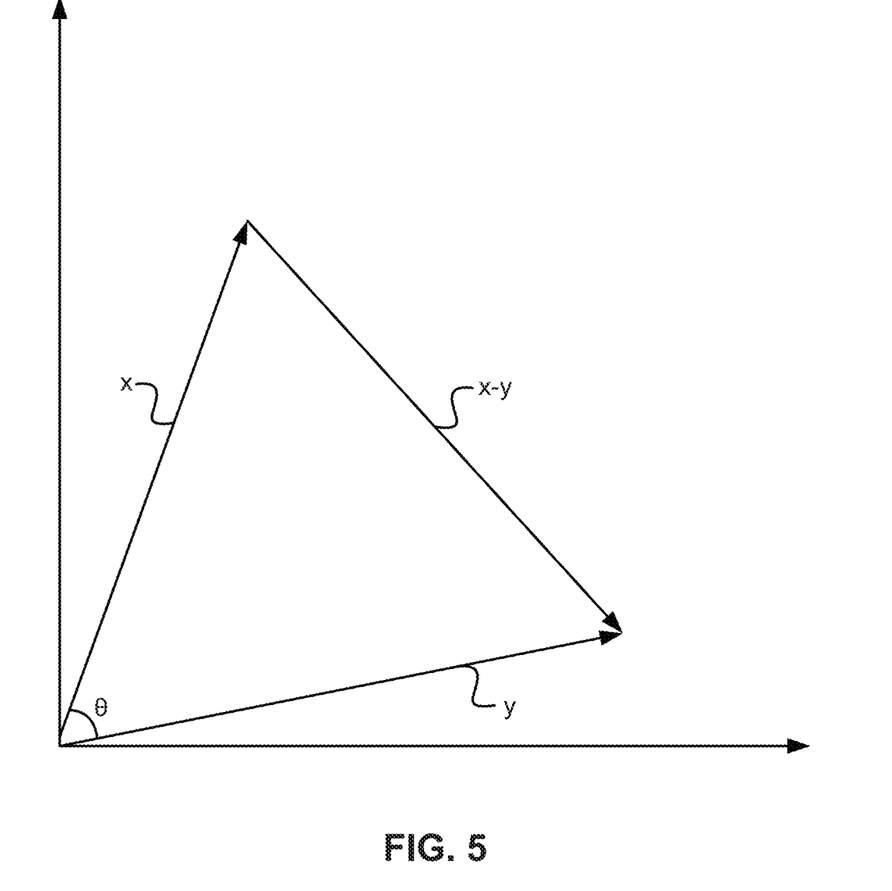
FIG. 5 shows an example of a method for calculating the projection of one vector onto another, according to one embodiment.

This data may then be transformed into a set of vectors. For example, as shown in Tables 1 and 2, drive manufacturer D1 may be represented by vector <194, −160, 133>. By converting the data to vectors, it is possible to calculate the projection of one of the vectors onto another, as shown in FIG. 5. For example, given two vectors, x and y, and the corresponding unit vectors u and v:

$$\cos(\theta) = \frac{x^T \cdot y}{\|x\| \cdot \|y\|} = u^T \cdot v$$

where $$u = \frac{1}{\|x\|} x \quad v = \frac{1}{\|y\|} y$$

The closer the two vectors are to one another, $\cos(\theta)$ will approach 1. The farther two vectors are apart, the value of $\cos(\theta)$ will approach −1. Note that when the vectors are perpendicular, the value of $\cos(\theta)$ is 0.

Creating a matrix X using the information from the tables above, the matrix X appears as shown below.

$$X = \begin{pmatrix} 194 & -196 & 184 & -204 & -6 & -16 & 44 \\ -160 & -15 & 140 & -119 & -16 & 60 & 110 \\ 133 & 123 & -157 & -95 & -26 & 9 & 13 \end{pmatrix}$$

Each manufacturer may then be represented by its own vector, for example, vector $x_1$ can represent DDM manufacturer D1, $x_2$ can represent DDM manufacturer D2, etc., as shown below.

$$x_1 = \begin{pmatrix} 194 \\ -160 \\ 133 \end{pmatrix} \quad x_2 = \begin{pmatrix} -196 \\ -15 \\ 123 \end{pmatrix} \quad x_3 = \begin{pmatrix} 184 \\ 140 \\ -157 \end{pmatrix}$$

Each vector may then be represented by unit vectors according to the equation shown below.

$$u_1 = \frac{1}{\|x_1\|} \cdot x_1$$

Computing each unit vector results in the following unit vectors, along with the remaining unit vectors not shown for DDM manufacturers D4-D7.

$$u_1 = \begin{pmatrix} 0.682 \\ -0.562 \\ 0.468 \end{pmatrix} \quad u_2 = \begin{pmatrix} -0.845 \\ -0.065 \\ 0.53 \end{pmatrix} \quad u_3 = \begin{pmatrix} 0.658 \\ 0.501 \\ -0.562 \end{pmatrix}$$

The unit vectors for DDM manufacturers D1-D7 may then be combined into a single matrix U as shown below.

$$U = \begin{pmatrix} 0.682 & -0.845 & 0.658 & -0.801 & -0.193 & -0.255 & 0.369 \\ -0.562 & -0.065 & 0.501 & -0.467 & -0.514 & 0.956 & 0.923 \\ 0.468 & 0.53 & -0.562 & -0.373 & -0.836 & 0.143 & 0.109 \end{pmatrix}$$

A correlation, C, between each of the vectors may be computed using a transform equation $C = U^T \cdot U$, such that the following C matrix is computed.

$$C = \begin{pmatrix} 1 & -0.292 & -0.095 & -0.458 & -0.233 & -0.645 & -0.216 \\ -0.292 & 1 & -0.887 & 0.51 & -0.247 & 0.23 & -0.314 \\ -0.095 & -0.887 & 1 & -0.552 & 0.085 & 0.231 & 0.644 \\ -0.458 & 0.51 & -0.552 & 1 & 0.707 & -0.296 & -0.768 \\ -0.233 & -0.247 & 0.085 & 0.707 & 1 & -0.562 & -0.637 \\ 0.645 & 0.23 & 0.231 & -0.296 & -0.562 & 1 & 0.804 \\ -0.216 & -0.314 & 0.644 & -0.768 & -0.637 & 0.804 & 1 \end{pmatrix}$$

Each (i,j) entry in the C matrix represents the correlation between the ith and jth DDM manufacturer. Note that when i=j, the correlation is 1 because the vector is being correlated to itself.

For example, to compare DDM manufacturer D1 against D2 one would look at either column 1-row 2, or column 2-row 1 of the C matrix, which is −0.292. Considering −0.292 is not close to 1, and is in fact quite far from 1 considering −1 is the extreme far position, it is clear that the failures of these two DDM manufacturers are not comparable.

By looking at the correlation C matrix, it is now possible to answer the question, which DDM is the worst between D1, D3 and D7? This can be answered by determining which DDM is least like D4, the DDM with the least number of total failures. Looking at column 4 in the C matrix, row 7 has the lowest correlation at −0.768, thereby indicating that D7 is the least like D4; therefore, one could conclude D7 is the worst performer.

In addition, by looking at column 7, one could also conclude that D6 is failing in a similar fashion as drive D7, which would have been difficult to conclude by simply looking at the total failures. One reason for this phenomenon may be that D6 may be a relatively new DDM in the field with less data collected, but it should be flagged since it is failing in the same way as D7.

The algorithm output will therefore show that D1, D3 and D7 are failing the most overall, with D7 being the DDM that is exhibiting the worst overall failure and D6 being flagged as exhibiting a failure rate pattern most similar to D7.

Figure 7:
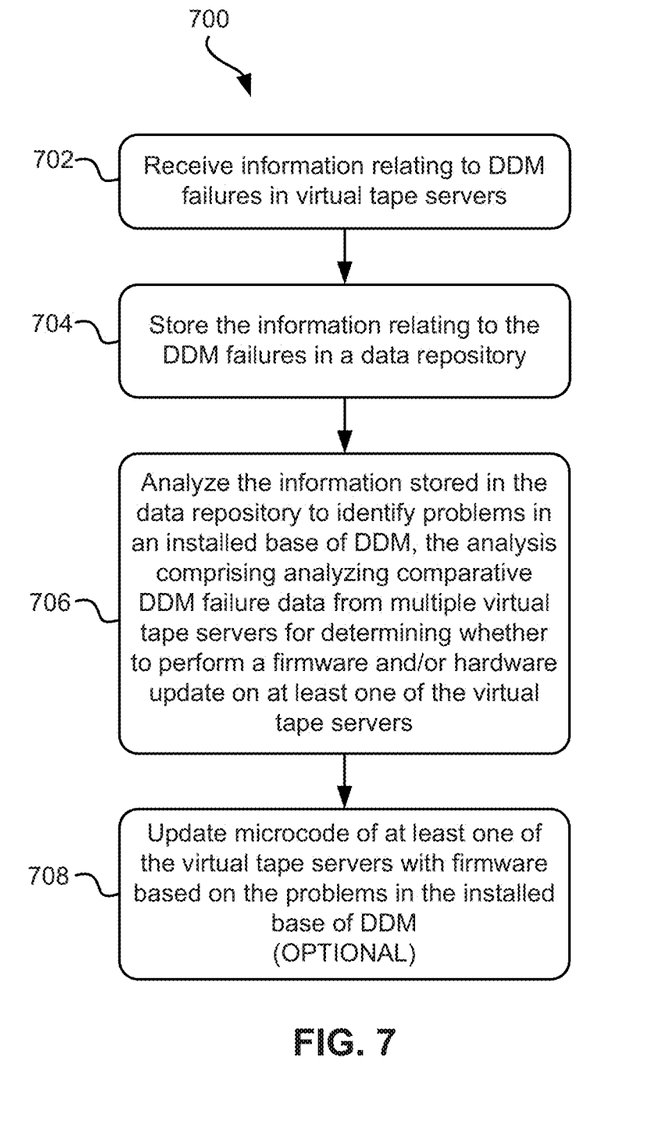
FIG. 7 shows a flowchart of a method, according to one embodiment.

Now referring to FIG. 7, a method 700 for managing DDM failures is shown according to one embodiment. The method 700 may be carried out in any desired environment, including those described in FIGS. 1-4, according to various embodiments.

In operation 702, information relating to DDM failures in virtual tape servers is received. Any method of identifying failures may be used as would be apparent to one of skill in the art upon reading the present descriptions.

In operation 704, the information relating to the DDM failures is stored to a data repository. The data repository may be maintained at a facility remote from the VTS, may be maintained at the VTS location, may be maintained by the VTS, etc. In more approaches, the data repository may be kept at a central location remote from each VTS having DDMs installed, wherein each VTS may upload failure information to the data repository periodically, when they are identified, when a threshold amount are identified, etc., or the system that maintains the data repository may request failure information from the VTS periodically, when updates are performed, etc.

In one embodiment, information relating to the DDM failures may comprise at least one failure type. The failure type may include a hard failure, a soft failure, and/or a manual failure, as described previously. Other information may be included, such as VTS information, activity when the failure occurred, other components experiencing problems, etc.

According to one approach, storing the information relating to the DDM failures may comprise creating data entries comprising the information relating to the DDM failures in the data repository, or updating existing data entries in the data repository with the information relating to the DDM failures. Of course, if the entry does not exist, it must be created, but if it does exist, then it may simply be updated with the new failure information. The data entries may be separated by DDM manufacturer, DDM type, DDM speed, DDM size, installation site, date of installation, or any other parameter as would be understood by one of skill upon reading the present descriptions.

In operation 706, the information stored in the data repository is analyzed to identify problems in an installed base of DDM, the analysis comprising analyzing comparative DDM failure data from multiple VTSs for determining whether to perform a firmware and/or hardware update on at least one of the VTSs. The installed base may include a plurality of VTSs, each having a plurality of DDM therein. Thereby, the problems that are identified and fixed at one VTS may be applied as learned experience to another VTS that may have not experienced the problem yet.

According to one embodiment, analyzing the information may comprise calculating a mean value for each of the at least one data type, calculating a deviation from the mean value for each of the at least one data type for each data entry in the data repository, calculating a vector for each data entry in the data repository, the vector comprising a dimension for each of the at least one data type, comparing each vector for each data entry in the data repository via a pairwise vector projection, calculating a unit vector for each vector for each data entry in the data repository, generating a unit vector matrix comprising the unit vector for each vector for each data entry in the data repository, generating a correlation matrix comprising a dot product of the unit vector matrix and a transpose of the unit vector matrix, identifying at least one data entry in the data repository satisfying a performance threshold, and identifying at least one related data entry in the data repository satisfying a correlation threshold. Of course, any other analytical methods may be used to perform data analysis on the failure data in the data repository as would be understood by one of skill in the art upon reading the present descriptions.

In one approach, identifying at least one data entry in the data repository satisfying a performance threshold may comprise identifying a best performing DDM, and identifying at least one related data entry in the data repository satisfying a correlation threshold may comprise identifying at least one entry in the data repository having a value in the correlation matrix corresponding to the best performing DDM that is closest to 1.0, as described previously.

In another approach, identifying at least one data entry in the data repository satisfying a performance threshold may further comprise identifying a worst performing DDM by identifying at least one entry in the data repository having a value in the correlation matrix corresponding to the best performing DDM that is closest to −1.0, as previously described.

In yet another approach, identifying at least one data entry in the data repository satisfying a performance threshold may comprise identifying a worst performing DDM, and identifying at least one related data entry in the data repository satisfying a correlation threshold may comprise identifying at least one entry in the data repository having a value in the correlation matrix corresponding to the worst performing DDM that is closest to 1.0, as previously described.

In optional operation 708, microcode of at least one of the VTSs may be updated with firmware based on the problems in the installed base of DDM. If the problems discovered do not require updating the microcode of a VTS with new firmware, then this operation may be omitted, which is a goal of the method 700, according to one approach.

Of course, this is simply an example of how the methods described herein may be applied to a set of data. More or less operations, functions, comparisons, analysis, etc., may be applied to the collected data as would be apparent to one of skill in the art upon reading the present descriptions.

Once the analysis is complete, any result from the analysis may be output through any method or device, such as sending instructions and/or commands to an administrator, technician, user, etc., pushing and/or installing microcode and/or firmware to a VTS and/or DSD, issuing an alert to an administrator, technician, user, etc., or any other output as would be understood by one of skill in the art upon reading the present descriptions.

The basic principle, according to various embodiments, has been described above in conjunction with specific embodiments; however, it should be noted that those skilled in the art can appreciate that any or all steps, operations, etc., of the methods and apparatuses described above may be implemented in any computing system (including processor, storage medium, logic, etc.), network of computer systems in hardware, firmware, software, or a combination thereof, and that this may be achieved by those skilled in the art using basic programming skill after reading the present descriptions.

According to one exemplary embodiment, a computer program product for managing DDM failures comprises a computer readable storage medium having computer readable program code embodied therewith, the computer readable program code comprises computer readable program code configured to: receive information relating to DDM failures in virtual tape servers, store the information relating to the DDM failures in a data repository, and analyze the information stored in the data repository to identify problems in an installed base of the DDM, the analysis comprising analyzing comparative DDM failure data.

In one embodiment, the comparative DDM failure data may comprise vectors, and the analyzing may comprise computing a cosine of the vectors. In another embodiment, the analyzing may comprise analyzing the vectors for determining whether to perform a firmware and/or hardware update on at least one of the DDM.

In one approach, analyzing the information may comprise any or all of: calculating a mean value for each of the at least one data type; calculating a deviation from the mean value for each of the at least one data type for each data entry in the data repository; calculating a vector for each data entry in the data repository, the vector comprising a dimension for each of the at least one data type; comparing each vector for each data entry in the data repository via a pairwise vector projection; calculating a unit vector for each vector for each data entry in the data repository: generating a unit vector matrix comprising the unit vector for each vector for each data entry in the data repository; generating a correlation matrix comprising a dot product of the unit vector matrix and a transpose of the unit vector matrix; identifying at least one data entry in the data repository satisfying a performance threshold; and identifying at least one related data entry in the data repository satisfying a correlation threshold.

In a further approach, identifying at least one data entry in the data repository satisfying a performance threshold may include identifying a best performing DDM. In addition, in some approaches, identifying at least one related data entry in the data repository satisfying a correlation threshold may include identifying at least one entry in the data repository having a value in the correlation matrix corresponding to the best performing DDM that is closest to 1.0. Further, identifying at least one data entry in the data repository satisfying a performance threshold may further comprise identifying a worst performing DDM by identifying at least one entry in the data repository having a value in the correlation matrix corresponding to the best performing DDM that is closest to −1.0.

In another approach, identifying at least one data entry in the data repository satisfying a performance threshold may include identifying a worst performing DDM. Further, identifying at least one related data entry in the data repository satisfying a correlation threshold may include identifying at least one entry in the data repository having a value in the correlation matrix corresponding to the worst performing DDM that is closest to 1.0.

In one embodiment, computer readable program code configured to update microcode of the virtual tape server with firmware based on the problems in the installed base of the at least one DDM may also be included.

In one approach, the information relating to the DDM failures may include at least one failure type, and wherein the at least one failure type comprises: a hard failure; a soft failure; and a manual failure. In this approach, storing information relating to the DDM failures may include creating data entries comprising the information relating to the DDM failures in the data repository, or updating existing data entries in the data repository with the information relating to the DDM failures.

Thus, improvements to system performance may also be implemented by running a program or a set of programs on any computing apparatus. The computing apparatus may be any general purpose computing machine, or any specific computing machine, as would be understood by one having ordinary skill in the art upon reading the present descriptions. Thus, the object may also be implemented by merely providing a computer program product which includes computer readable program code for implementing the methods described herein.

In another exemplary embodiment, a system comprises logic adapted for receiving information relating to DDM failures in an installed base of DDM across multiple VTSs, a storage device adapted for storing the information relating to the DDM failures in a data repository, and a processor adapted for analyzing the information stored in the data repository to identify problems in the installed base of DDM, the analysis comprising analyzing comparative DDM failure data comprising vectors. Of course, the system may include more or less components, logic, hardware, etc., as would be understood by one of skill in the art upon reading the present descriptions. The processor may be any processor, such as a CPU, a FPGA, an ASIC, etc.

In one embodiment, the system may include logic adapted for updating microcode of one or more of the multiple VTSs with firmware based on the problems in the installed base of DDM. The installed base of DDM may include DDM in multiple virtual tape servers across multiple installation sites, multiple customer sites, different buildings, etc.

In another embodiment, the analyzing may comprise computing a cosine of the vectors.

In one embodiment, the information relating to the DDM failures may comprise at least one failure type, e.g., a hard failure, a soft failure, or a manual failure, and analyzing the information may include any or all of: calculating a mean value for each of the at least one data type; calculating a deviation from the mean value for each of the at least one data type for each data entry in the data repository; calculating a vector for each data entry in the data repository, the vector comprising a dimension for each of the at least one data type; comparing each vector for each data entry in the data repository via a pairwise vector projection; calculating a unit vector for each vector for each data entry in the data repository: generating a unit vector matrix comprising the unit vector for each vector for each data entry in the data repository; generating a correlation matrix comprising a dot product of the unit vector matrix and a transpose of the unit vector matrix; identifying at least one data entry in the data repository satisfying a performance threshold; and identifying at least one related data entry in the data repository satisfying a correlation threshold.

Further, operations for performing the above series of processes may be performed according to the described order naturally in time sequence, but not necessarily in time sequence. Some operations may be performed in parallel or independent to each other.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for managing disk drive media (DDM) failures, the computer program product comprising a non-transitory computer readable storage medium having program instructions embodied therewith, the program instructions being executable by a processor to cause the processor to:
  store, by the processor, information relating to DDM failures in a data repository by at least one of:
    creating data entries comprising the information relating to the DDM failures in the data repository, and
    updating existing data entries in the data repository with the information relating to the DDM failures; and
  analyze, by the processor, information relating to the DDM failures and stored in the data repository to identify problems in an installed base of DDM, the analysis comprising analyzing comparative DDM failure data.

2. The computer program product as recited in claim 1, wherein the comparative DDM failure data comprises vectors generated from the information relating to the DDM failures.

3. The computer program product as recited in claim 1, wherein the comparative DDM failure data comprises vectors generated from the information relating to the DDM failures, wherein the analyzing comprises analyzing the vectors for determining whether to perform a firmware and/or hardware update on at least one of the DDM.

4. The computer program product as recited in claim 1, wherein the DDM failures are in virtual tape servers.

5. The computer program product as recited in claim 1, comprising computer readable program code configured to decide whether to update microcode of a virtual tape server with firmware based on the problems in the installed base of the at least one DDM.

6. The computer program product as recited in claim 1, wherein the information relating to the DDM failures comprises at least one failure type, and wherein the at least one failure type comprises: a hard failure; a soft failure; and a manual failure.

7. A method for managing disk drive media (DDM) failures, the method comprising:
  analyzing, using a hardware processor, information relating to DDM failures to identify problems in an installed base of DDM, the analysis comprising analyzing comparative DDM failure data;
  storing the information relating to the DDM failures, wherein the storing comprises, for each of the DDM failures, at least one of:
    creating a data entry comprising the information relating to the DDM failure in the data repository, and
    updating an existing data entry in the data repository with the information relating to the DDM failure.

8. The method as recited in claim 7, wherein the DDM failures are in virtual tape servers.

9. The method as recited in claim 7, comprising deciding whether to update microcode of at least one virtual tape server with firmware based on the problems in the installed base of DDM.

10. The method as recited in claim 7, wherein the information relating to the DDM failures comprises at least one failure type, and wherein the at least one failure type comprises: a hard failure; a soft failure; and a manual failure.

11. The method as recited in claim 7, wherein the comparative DDM failure data comprises vectors generated from the information relating to the DDM failures.

12. The method as recited in claim 7, wherein the comparative DDM failure data comprises vectors generated from the information relating to the DDM failures, wherein the analyzing comprises analyzing the vectors for determining whether to perform a firmware and/or hardware update on at least one of the DDM.

13. A system, comprising:
  a processor and logic integrated with the processor, executable by the processor, or integrated with and executable by the processor, the logic being configured to:
  analyze information relating to DDM to identify problems in an installed base of DDM, the analysis comprising analyzing comparative DDM failure data; and
  store information relating to the DDM failures in the data repository by at least one of:
    creating data entries comprising the information relating to the DDM failures in the data repository, and
    updating existing data entries in the data repository with the information relating to the DDM failures.

14. The system as recited in claim 13, wherein the DDM failures are in virtual tape servers.

15. The system as recited in claim 13, comprising logic configured to decide whether to update microcode of a virtual tape server with firmware based on the problems in the installed base of the at least one DDM.

16. The system as recited in claim 13, wherein the information relating to the DDM failures comprises at least one failure type, and wherein the at least one failure type comprises: a hard failure; a soft failure; and a manual failure.

* * * * *